(12) United States Patent
Snelick et al.

(10) Patent No.: US 7,411,328 B2
(45) Date of Patent: Aug. 12, 2008

(54) DYNAMO ELECTRIC MACHINES

(75) Inventors: John Gregory Snelick, Canal Fulton, OH (US); Thomas Edward Morgan, Painesville, OH (US); Adam Brian Brugmann, Mantua, OH (US)

(73) Assignee: Goodrich Corporation, Charlotte, NC (US)

( * ) Notice: Subject to any disclaimer, the term of this patent is extended or adjusted under 35 U.S.C. 154(b) by 174 days.

(21) Appl. No.: 11/223,466

(22) Filed: Sep. 9, 2005

(65) Prior Publication Data

US 2008/0012447 A1 Jan. 17, 2008

(30) Foreign Application Priority Data

Sep. 11, 2004 (EP) .................................... 0420199

(51) Int. Cl.
*H02K 23/52* (2006.01)
*H02K 7/18* (2006.01)
*F16C 3/02* (2006.01)

(52) U.S. Cl. ..................... 310/75 D; 310/261; 310/177; 464/89

(58) Field of Classification Search ............... 310/75 D; 464/89, 182, 183
See application file for complete search history.

(56) References Cited

U.S. PATENT DOCUMENTS

| | | | | | |
|---|---|---|---|---|---|
| 2,404,115 | A | * | 7/1946 | Williams | 105/131 |
| 2,476,894 | A | * | 7/1949 | Mulheim | 464/17 |
| 2,500,175 | A | * | 3/1950 | Guthrie | 310/75 D |
| 2,560,644 | A | * | 7/1951 | Hartzell | 464/75 |
| 2,622,417 | A | * | 12/1952 | Brown et al. | 464/17 |
| 2,658,361 | A | * | 11/1953 | Kalikow | 464/97 |
| 2,956,187 | A | * | 10/1960 | Wood | 310/75 R |
| 3,146,612 | A | * | 9/1964 | Lorenz | 464/30 |
| 4,484,094 | A | * | 11/1984 | Ade et al. | 310/43 |
| 4,895,470 | A | | 1/1990 | Scherzinger | |
| 5,731,644 | A | * | 3/1998 | Drlik | 310/58 |
| 5,789,832 | A | * | 8/1998 | Hwang | 310/43 |
| 6,072,252 | A | * | 6/2000 | Van Dine et al. | 310/43 |
| 6,218,757 | B1 | * | 4/2001 | Ong et al. | 310/223 |
| 6,249,070 | B1 | * | 6/2001 | Sharp | 310/90.5 |

FOREIGN PATENT DOCUMENTS

FR 2 803 125 6/2001
JP 2000-55066 * 2/2000

OTHER PUBLICATIONS

European Search Report for corresponding European Application EP 05 25 5547, having a mailing date of Mar. 30, 2007.

* cited by examiner

*Primary Examiner*—Burton Mullins
(74) *Attorney, Agent, or Firm*—Andrus, Sceales, Starke & Sawall, LLP

(57) ABSTRACT

A dynamo electric machine for an aircraft gas turbine engine includes a housing supporting a stator of the dynamo electric machine, a rotor assembly rotatably mounted in the housing and including an elongate hollow rotor shaft, a main shaft for connection at one end to the associated gas turbine engine assembly, said main shaft extending coaxially within said hollow rotor shaft, and a sleeve-like member of electrically insulating material between said rotor shaft and said main shaft, said sleeve-like member providing an electrically insulating driving connection between said main shaft and said rotor shaft whereby said main shaft and said rotor shaft rotate together.

17 Claims, 3 Drawing Sheets

DYNAMO ELECTRIC MACHINES

This invention relates to a dynamo electric machine particularly intended for use in conjunction with an aircraft gas turbine engine. Primarily, but not exclusively, the machine may be a starter/generator which is used to drive the gas turbine engine during starting, and is driven by the gas turbine engine during normal running, to generate electrical power for the aircraft systems.

It is usual for a dynamo electric machine to include a main shaft which is in driving connection with a gearbox shaft of the engine, often through a splined connection. In a conventional dynamo electric machine the potential exists for electrical leakage current from, for example, the rotor of the machine, to flow through the drive shaft and into the gearbox/ gas turbine engine assembly. It is an object of the present invention to provide a dynamo electric machine, primarily but not exclusively a starter/generator, in which the possibility of such an electrical leakage path is obviated.

U.S. Pat. No. 6,710,482 discloses a starter/generator for an aircraft gas turbine engine in which the possibility of leakage current flowing from the machine to the engine and gearbox assembly in use, is prevented by the provision, externally of the housing of the starter/generator, of an electrically insulating coupling member interconnecting the rotor shaft of the starter/generator with the main shaft thereof for rotation. While the starter/generator disclosed in U.S. Pat. No. 6,710,482 achieves the objective of the present invention, it does so by providing a starter/generator which will not fit within the spatial envelope of a conventional starter/generator, and so cannot be used as a service replacement for a conventional starter/generator. Moreover the construction disclosed in U.S. Pat. No. 6,710,482 is relatively expensive to produce. Accordingly, it is a further object of the present invention to provide a starter/generator for an aircraft gas turbine engine in which these disadvantages are also obviated.

In accordance with the present invention there is provided a dynamo electric machine for an aircraft gas turbine engine including a housing supporting a stator of the dynamo electric machine, a rotor assembly rotatably mounted in the housing and including an elongate hollow rotor shaft, a main shaft for connection at one end to the associated gas turbine engine assembly, said main shaft extending coaxially within said hollow rotor shaft, and, a sleeve-like member of electrically insulating material between said rotor shaft and said main shaft, said sleeve-like member providing an electrically insulating driving connection between said main shaft and said rotor shaft whereby said main shaft and said rotor shaft rotate together.

Preferably said sleeve-like member, the region of the main shaft within said member, and the region of the rotor shaft housing said member are all of correspondingly non-circular cross-section.

Desirably said non-circular cross-section is a square cross-section.

Preferably the corners of said square cross-section are rounded.

A dynamo electric machine in accordance with one example of the invention is illustrated in the accompanying drawings wherein.

Figure 1:
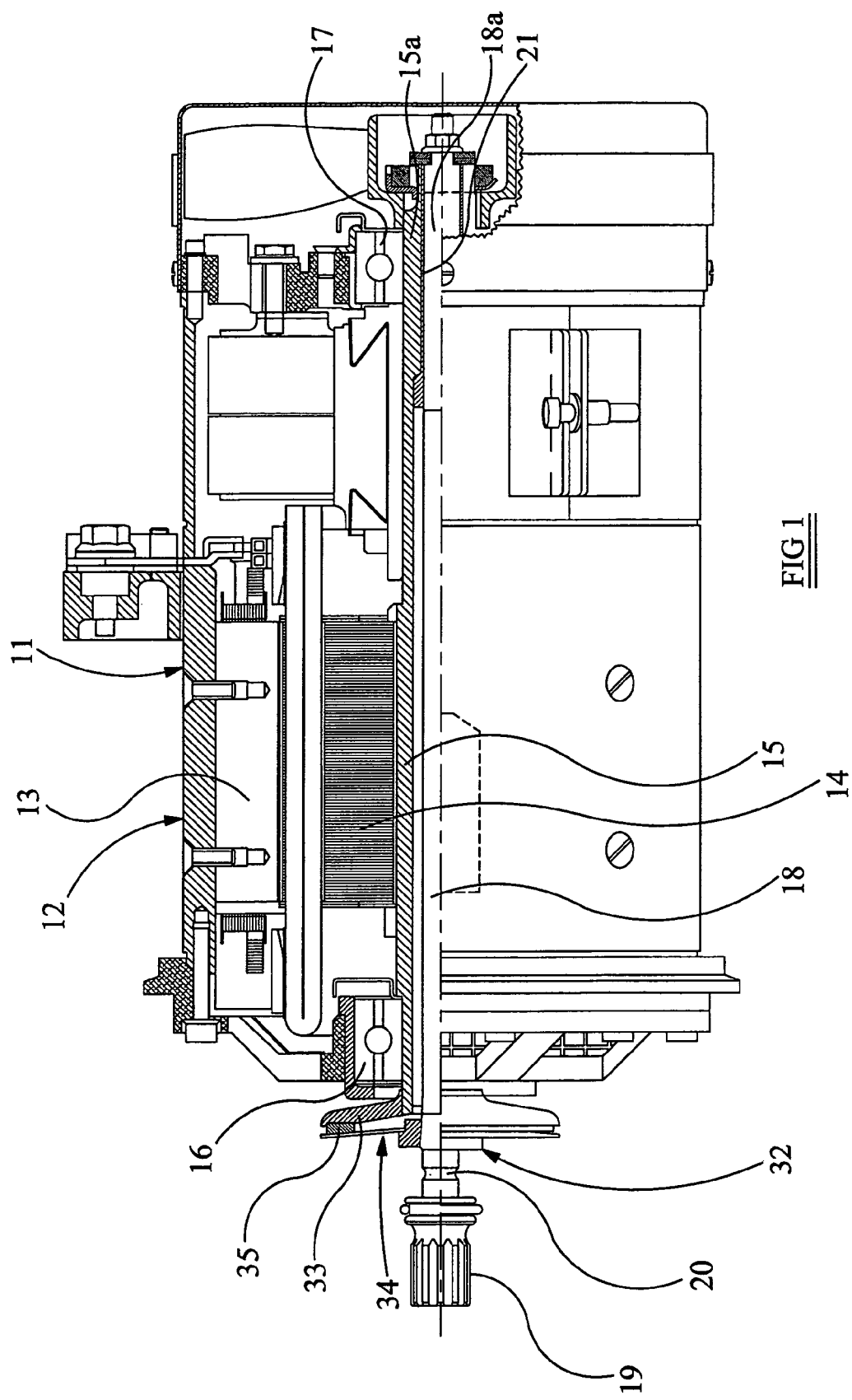
FIG. 1 is a diagrammatic side elevational view, partly in cross-section, of a starter/generator for an aircraft gas turbine engine.
Figure 2:
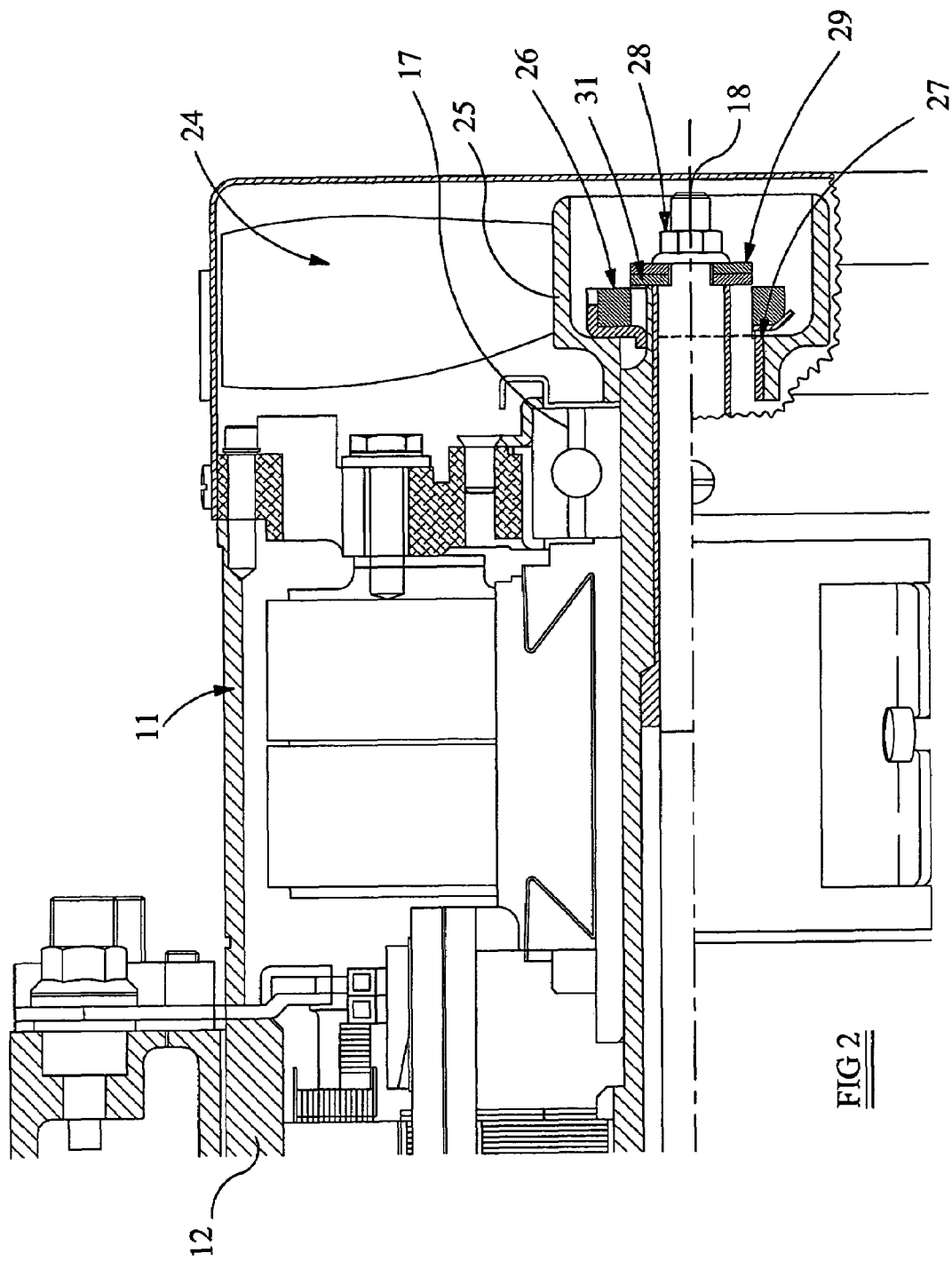
FIG. 2 is an enlargement of part of FIG. 1.
Figure 4:
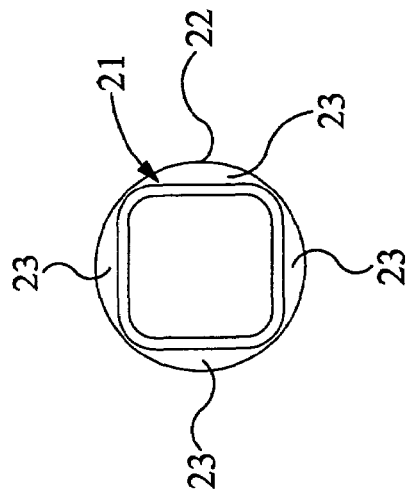
FIG. 4 is an end elevational view of the sleeve of FIG. 3.

Referring to the drawings, the dynamo electric machine which is illustrated is a starter/generator for use in conjunction with an aircraft gas turbine engine. The machine includes an outer housing 11 incorporating a magnetic yoke 12 supporting a stator assembly 13. A rotor assembly 14 is rotatable within the stator assembly and includes an elongate hollow rotor shaft 15 journalled adjacent its ends in bearings 16, 17 in the housing 11. In conventional manner a commutator is carried by the rotor shaft 15 and co-acts with brushes in a stationary brush assembly carried by the housing 11 and/or the stator assembly. The operation of the machine as a starter/generator is conventional, and will be understood by those skilled in the art.

Received coaxially within the hollow rotor shaft 15 is a machine main shaft 18 which protrudes, at one axial end, from the shaft 15 and the housing 11, and is formed with an integral drive member in the form of an axially splined connector 19 coaxial with the remainder of the shaft. Adjacent the connector 19 the shaft 18 is provided with a region of reduced cross-sectional area 20 forming a shear neck intended to fracture in the event of transmission of torque in excess of a predetermined maximum value.

Figure 5:
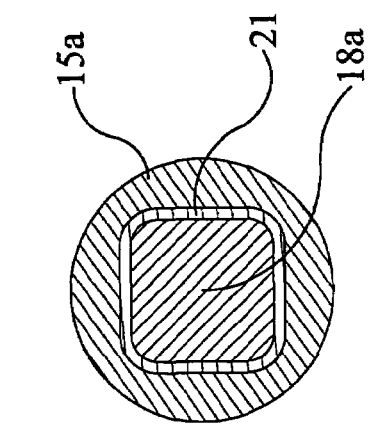
FIG. 5 is a cross-sectional view on the line 5-5 in FIG. 2.

An end region 15a of the rotor shaft 15, within the housing 11, adjacent the bearing 17, is internally of square, cross-section, having rounded or radiused corners (see FIG. 5). Received as a close, axial sliding fit in the square section passage of the rotor shaft region 15a is an elongate sleeve 21 formed from an electrically insulating material, desirably a wear resistant polymer such as "Vespel" (available from Dupont) or "Torlon" (available from Solvay Advanced Polymers). The external cross-sectional shape of the sleeve 21 matches the internal cross-sectional shape of the passage of the shaft region 15a, and the wall thickness of the sleeve 21 is constant so that the passage of the sleeve is also of square cross-section with rounded corners, but of smaller dimensions than the passage of the shaft region 15a by the amount of the wall thickness of the sleeve 21. It is to be understood that a square cross-section is not essential and cross-sections having from four to eight sides could be utilized provided that the shape, thickness and material selected is such that the sleeve can transmit a torque in excess of the shear neck 20 so that the shear neck would fail before the sleeve.

The main shaft 18 includes a region 18a which is received within the sleeve 21 as a close, axially sliding, fit. The region 18a of the shaft 18 is thus of square cross-section with rounded corners having outer dimensions equal to the inner dimensions of the sleeve 21. It will be recognised that rather than providing a separately formed sleeve 21 slid onto the shaft 18, the sleeve can be moulded onto the shaft 18 using the shaft 18 as a mould core around which the resin material of the sleeve flows before curing or solidifying.

Throughout the remainder of the shaft 15 the central bore thereof is of circular cross-section, and similarly with the exception of the region 18a the shaft 18 is of circular cross-section. At one axial end the sleeve 21 is formed with an externally cylindrical boss 22 the outer surface of which engages the cylindrical inner surface of the bore of the rotor shaft 15, the cylindrical boss being coaxial with the remainder of the sleeve, and defining therewith a plurality of abutment shoulders 23 which engage corresponding shoulders internally of the shaft 15 to limit movement of the sleeve 21 from the left to the right in FIG. 1, during assembly.

The right hand end of the rotor shaft 15 protrudes through the inner race of the bearing 17 and receives, at its protruding end, a fan assembly 24 including an integral hollow boss 25. The shaft 15 extends through a central bore of the boss 25 and a threaded nut 26 abutting the interior of the boss 25 clamps the boss against the inner race of the bearing 17 to secure the boss, and therefore the fan assembly 24 to the shaft. A pin 27 is inserted axially into aligned axial grooves of the boss and the shaft 15 to lock the boss to the shaft for rotation therewith even if the clamping force clamping the boss against the inner race of the bearing 17 is loosened.

The right hand end of the shaft 18 protrudes from the shaft 15 into the hollow of the boss 25, and includes a reduced cross-section region which is externally screw threaded and receives a clamping nut 28. A steel load spreading washer 29 and an electrically insulating washer 31 are interposed between the nut 28 and the nut 26, and tightening of the nut 28 on the shaft 18 clamps the shaft 18 against the end of the shaft 15, the washer 31 in conjunction with the sleeve 21 ensuring electrical isolation of the end region of the shaft 18 from the shaft 15 and the rotor assembly.

The axial loading imposed on the shaft 18 by the clamping nut 28 is reacted at the opposite end of the machine by a spring loaded dampener assembly 32 which is arranged in known manner to damp rotational oscillations of the shaft 18 relative to the shaft 15. The dampener 32 includes a rigid disc 33 fixed to the shaft 15, a spring disc 34 fixed to the shaft 18 through a hub, and an electrically insulating friction element 35 typically formed from a polyphenylenesulfide (PPS) interposed between the discs 33 and 34.

It will be recognised that the sleeve 21 in conjunction with the non-circular regions 15a and 18a of the shafts 15 and 18, constitutes a torque transmitting coupling between the shafts 15 and 18 so that the shafts rotate as one. The splined connector 19 of the shaft 18 is, in use, engaged with a drive shaft in the gearbox of the gas turbine engine, and when the machine is used as a starter, electrical current is supplied to the machine to cause the rotor 14 to rotate. Rotation of the shaft 15 is transmitted through the sleeve 21 to the shaft 18, and any torque fluctuations which might occur, as a result of torsional flexure of the shaft 18, are damped by the dampener 32. Thus the machine acts as a starter motor driving the engine, through its gearbox, to start the engine. Conversely, when the engine is running, the electrical supply to the machine is disconnected and the engine drives the shaft 18 through the gearbox and the splined connection 19, the shaft 18 driving the shaft 15 through the sleeve 21 so that the rotor 14 rotates in the stator 13 generating electricity to provide power to electrical systems of the aircraft.

There is however no electrical interconnection between the shafts 15 and 18, since both the sleeve 21, the washer 31, and the friction element 35 are formed from electrically insulating material. Thus the shaft 18 does not provide an electrical current leakage path from the machine to the engine and gearbox assembly.

Figure 6:
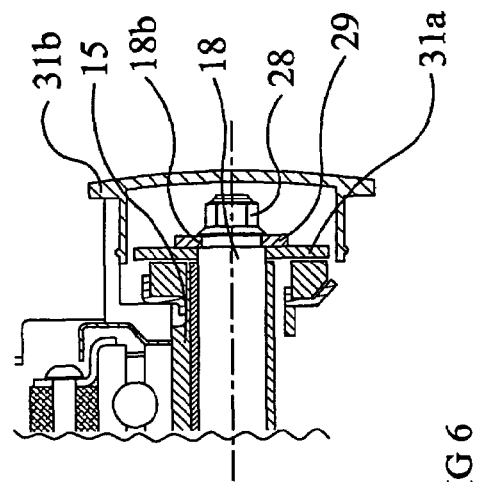
FIG. 6 illustrates a modified arrangement.
Figure 3:
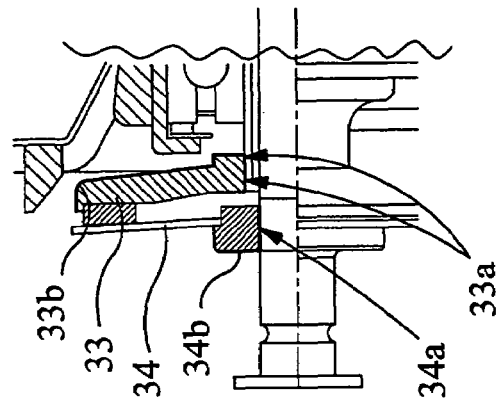
FIG. 3 is a side elevational view of an electrically insulating sleeve of FIG. 2.
Figure 3:
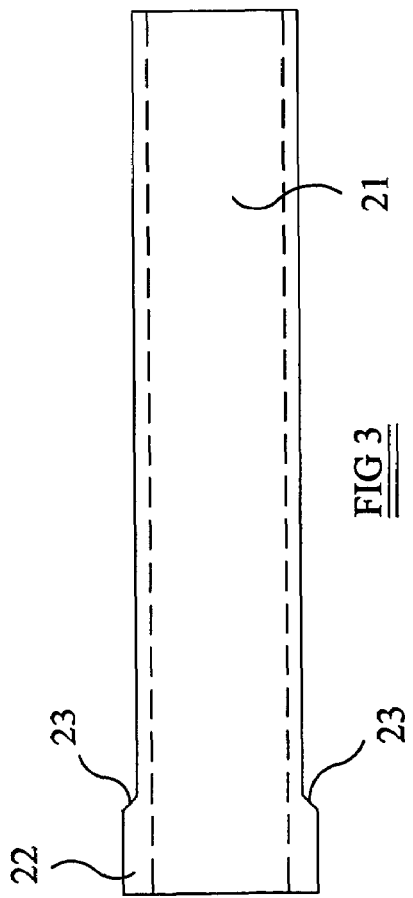

FIG. 6 illustrates an arrangement similar to that described and illustrated hereinbefore, but in which several modifications have been made to further enhance the resistance to electrical current leakage from the machine. Specifically the right hand, non-drive, end of the shafts 15, 18, and the connection therebetween, have been modified to incorporate an electrically insulating washer 31a of large diameter compared to that used in the embodiment of FIGS. 1 to 5. The use of a large diameter washer improves the resistance to carbon tracking. Further, a dust cap 31b is provided to reduce carbon dust build-up on these components. In order to reduce wear, the washer 31a is of increased internal diameter with the result that the load spreading washer 29 bears directly against a step 18b formed on the shaft 18, the clamping load between the nut 28 and the shaft 18 not being transmitted through the electrically insulating washer 31a.

The left hand, drive end has also been modified by the application of a ceramic, for example aluminium oxide, electrically insulating coating 33a, 34a to the inner diameters of the dampener disc 33 and the hub of the disc 34 where these components engage their respective shafts 15, 18 so as to electrically insulate the dampener discs 33, 34 from the shafts 15, 18. A non-stick coating 33b, 34b is also applied to parts of the dampener disc 33 and hub of the disc 34 to reduce or prevent carbon dust accumulating on the coated parts of these components. The non-stick coating is conveniently of a non-conductive fluorocarbon material containing PTFE, such as Xylan (RTM) available from Whitford Corporation. These modifications serve to reduce or prevent current leakage between the shafts 15, 18 in this part of the machine.

The invention claimed is:

1. A dynamo electric machine for an aircraft gas turbine engine including a housing supporting a stator of the dynamo electric machine, a rotor assembly rotatably mounted in the housing and including an elongate hollow rotor shaft, a main shaft for connection at one end to the associated gas turbine engine assembly, said main shaft extending coaxially within said hollow rotor shaft, and, a sleeve-like member of electrically insulating material between said rotor shaft and said main shaft, said sleeve-like member providing an electrically insulating driving connection between said main shaft and said rotor shaft whereby said main shaft and said rotor shaft rotate together,
wherein a large diameter washer of an electrically insulating material is carried adjacent one end of the main shaft.

2. A machine according to claim 1, wherein the sleeve-like member has an outer surface of non-circular cross-sectional shape, the inner surface of the adjacent part of the rotor shaft being of substantially the same non-circular shape.

3. A machine according to claim 2, wherein the said non-circular cross-sectional shape is a square section.

4. A machine according to claim 3, wherein the corners of the square cross-section are rounded.

5. A machine according to claim 1, wherein the sleeve-like member has an inner surface of non-circular cross-sectional shape, the outer surface of the adjacent part of the main shaft being of substantially the same non-circular shape.

6. A machine according to claim 5, wherein the said non-circular cross-sectional shape is a square section.

7. A machine according to claim 6, wherein the corners of said square cross-section are rounded.

8. A machine according to claim 1, further comprising a spring loaded dampener assembly.

9. A machine according to claim 8, wherein ceramic layers are interposed between components of the spring loaded dampener assembly and the rotor and main shafts.

10. A dynamo electric machine for an aircraft gas turbine engine including a housing supporting a stator of the dynamo electric machine, a rotor assembly rotatably mounted in the housing and including an elongate hollow rotor shaft, a main shaft for connection at one end to the associated gas turbine engine assembly, said main shaft extending coaxially within said hollow rotor shaft, and, a sleeve-like member of electrically insulating material between said rotor shaft and said main shaft, said sleeve-like member providing an electrically insulating driving connection between said main shaft and said rotor shaft whereby said main shaft and said rotor shaft rotate together,
wherein the sleeve-like member has an outer surface of non-circular cross-sectional shape, the inner surface of the adjacent part of the rotor shaft being of substantially the same non-circular shape, and wherein a large diameter washer of an electrically insulating material is carried adjacent one end of the main shaft.

11. A machine according to claim 10, wherein the said non-circular cross-sectional shape is a square section.

12. A machine according to claim 11, wherein the corners of the square cross-section are rounded.

13. A machine according to claim 10, wherein the sleeve-like member has an inner surface of non-circular cross-sectional shape, the outer surface of the adjacent part of the main shaft being of substantially the same non-circular shape.

14. A machine according to claim 13, wherein the said non-circular cross-sectional shape is a square section.

15. A machine according to claim 14, wherein the corners of said square cross-section are rounded.

16. A machine according to claim 10, further comprising a spring loaded dampener assembly.

17. A machine according to claim 16, wherein ceramic layers are interposed between components of the spring loaded dampener assembly and the rotor and main shafts.

* * * * *